United States Patent
Bjelcevic et al.

(10) Patent No.: US 12,380,478 B2
(45) Date of Patent: Aug. 5, 2025

(54) MULTI-ITEM PRODUCT RECOGNITION FOR CHECKOUTS

(71) Applicant: NCR Voyix Corporation, Atlanta, GA (US)

(72) Inventors: Stefan Bjelcevic, Roswell, GA (US); Christian Lee McDaniel, Atlanta, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 458 days.

(21) Appl. No.: 17/665,145

(22) Filed: Feb. 4, 2022

(65) Prior Publication Data

US 2023/0252542 A1 Aug. 10, 2023

(51) Int. Cl.
*G06T 7/55* (2017.01)
*G06K 7/14* (2006.01)
(Continued)

(52) U.S. Cl.
CPC ....... *G06Q 30/0623* (2013.01); *G06K 7/1413* (2013.01); *G06T 7/194* (2017.01); *G06T 7/55* (2017.01); *G06T 7/90* (2017.01); *G06V 10/762* (2022.01); *H04N 23/90* (2023.01); *G06T 2207/10024* (2013.01); *G06T 2207/10028* (2013.01); *G06T 2207/20081* (2013.01);
(Continued)

(58) Field of Classification Search
CPC .. G06T 7/55; G06T 7/90; G06T 7/194; G06T 2207/10024; G06T 2207/10028; G06T 2207/30232; G06T 2207/20081; G06T 2207/20221; G06T 2207/30242; G06V 10/762; G06V 10/82; G06V 10/255; G06V 10/16; G06V 20/64; G06V 20/52; H04N 23/90; G06Q 30/0623; G06K 7/1413

See application file for complete search history.

(56) References Cited

U.S. PATENT DOCUMENTS 10,134,120 B2  11/2018 Jovanovski et al.
10,496,898 B2  12/2019 Zisimopoulos et al.
(Continued)

OTHER PUBLICATIONS

EP Examination Report dated Feb. 14, 2025.

*Primary Examiner* — Vu Lee
*Assistant Examiner* — Tracy Mangialaschi
(74) *Attorney, Agent, or Firm* — Schwegman Lundberg & Woessner, P.A.

(57) ABSTRACT

Multiple images of a designated area are taken. The designated area comprises multiple items that are to be identified from the images. Depth information and Red, Green, Blue (RGB) data from each image is processed to create a point cloud for each image of the designated area. The point clouds are patched together or synchronized into a single point cloud for the designated area. Known background pixels associated with backgrounds for each image are removed from the single point cloud. The depth information and RGB data for the single point cloud is clustered together and bounding boxes are placed around each item in the single point cloud. At least the RGB data for each bounding box is provided to a machine-learning model (MLM) and the MLM returns an item code for the corresponding item. The item codes are fed to a transaction manager for a transaction associated with a customer.

20 Claims, 3 Drawing Sheets

(51) Int. Cl.
    *G06Q 30/0601* (2023.01)
    *G06T 7/194* (2017.01)
    *G06T 7/90* (2017.01)
    *G06V 10/762* (2022.01)
    *H04N 23/90* (2023.01)

(52) U.S. Cl.
    CPC ............... *G06T 2207/20221* (2013.01); *G06T 2207/30232* (2013.01); *G06T 2207/30242* (2013.01)

(56) References Cited

U.S. PATENT DOCUMENTS

| | | | |
|---|---|---|---|
| 11,481,751 B1* | 10/2022 | Chaubard | G06V 10/82 |
| 11,537,097 B2 | 12/2022 | Shapiro et al. | |
| 2013/0304595 A1 | 11/2013 | Goncalves | |
| 2015/0242943 A1* | 8/2015 | Abovitz | G02B 27/42 |
| | | | 705/27.2 |
| 2018/0232887 A1 | 8/2018 | Lin et al. | |
| 2019/0108396 A1* | 4/2019 | Dal Mutto | G06V 20/52 |
| 2021/0117948 A1* | 4/2021 | Voss | G06Q 20/322 |
| 2021/0295078 A1* | 9/2021 | Barkan | G06V 30/2247 |
| 2021/0334590 A1 | 10/2021 | Rodriguez et al. | |
| 2022/0019988 A1 | 1/2022 | Chilukuri | |
| 2022/0051179 A1 | 2/2022 | Savvides et al. | |
| 2022/0108264 A1 | 4/2022 | Skaff et al. | |

* cited by examiner

MULTI-ITEM PRODUCT RECOGNITION FOR CHECKOUTS

BACKGROUND

Item recognition by itself is a difficult task when the number of images for the item is small and when some of the images occlude the item. Multi-item recognition is even more difficult for many reasons, such as more occlusion of items that is present in the images (the items can be placed in front of one another). In fact, placing many items in one area at once inevitably leads to some items blocking the view of other items. Even if some of the item is visible in an image, a key identifying feature of that item may still be out of sight or blocked.

Many retailers offer a variety of forms of checkout to their customers. For example, cashier-assisted checkouts allow customers to place items on the conveyor belt and a cashier handles each item to scan or enter its item code and takes payment from the customer for checkout while operating a Point-Of-Sale (POS) terminal. Self-Service Terminals (SSTs) allow customers to scan or enter their own item barcodes and make payment for self-checkouts. Some retailers allow customers to use a mobile application to scan or enter item barcodes as the customers shop and pay either at a SST, POS terminal, of via the mobile application for checkout.

The goal of the industry is to permit frictionless checkouts where cameras and sensors associate the customer with an account within a store, monitor items the customer picks up, recognize the items from images of the camera, and charge a payment for the transaction of the customer when the customer leaves the store.

Frictionless shopping also encounters the occlusion problem because a customer's hands or other items may occlude an item and the item may be stacked onto other items within a customer's bag or basket such that a good image of the item may not be capable of being obtained to identify the item.

Convenience stores usually have small baskets and checkouts involve store assistants available to assist shoppers to enter or scan item codes (UPC) at Point-Of-Sale (POS) terminals operated by the store assistants. Unfortunately, convenience stores lack the physical space to install Self-Service Terminals (SSTs), which would allow the shoppers to perform self-checkouts with their items.

As a result, convenience stores can become really busy with shoppers queued in one or two queues to checkout with store assistants. Some shoppers who are buying only a few items that are not really needed may elect to put the item down and exit the store without making a purchase. These situations can be problematic for small community-based convenience stores that rely on a large quantity of transactions having a small number of purchased items on average for each transaction.

SUMMARY

In various embodiments, a system and methods for multi-item product recognition during checkouts are presented.

According to an embodiment, a method for multi-item product recognition during a checkout is provided. Multiple different images of a scene are obtained for a designated area. Depth information and Red, Green, Blue (RGB) data are extracted from each of the images. A point cloud is assembled for each of the images using the depth information and the RGB data. The point cloud for each of the images are assembled into a single point cloud and known background pixels are removed from the single point cloud creating a modified single point cloud. The depth information and the RGB data in the modified single point cloud are clustered into items that are present in the scene creating a clustered single point cloud; each cluster associated with a unique item present in the scene. Item codes are identified for each item by processing at least the RGB data associated with the corresponding items from each cluster of the clustered single point cloud. The item codes are provided for a transaction associated with a customer.

DETAILED DESCRIPTION

Figure 1:
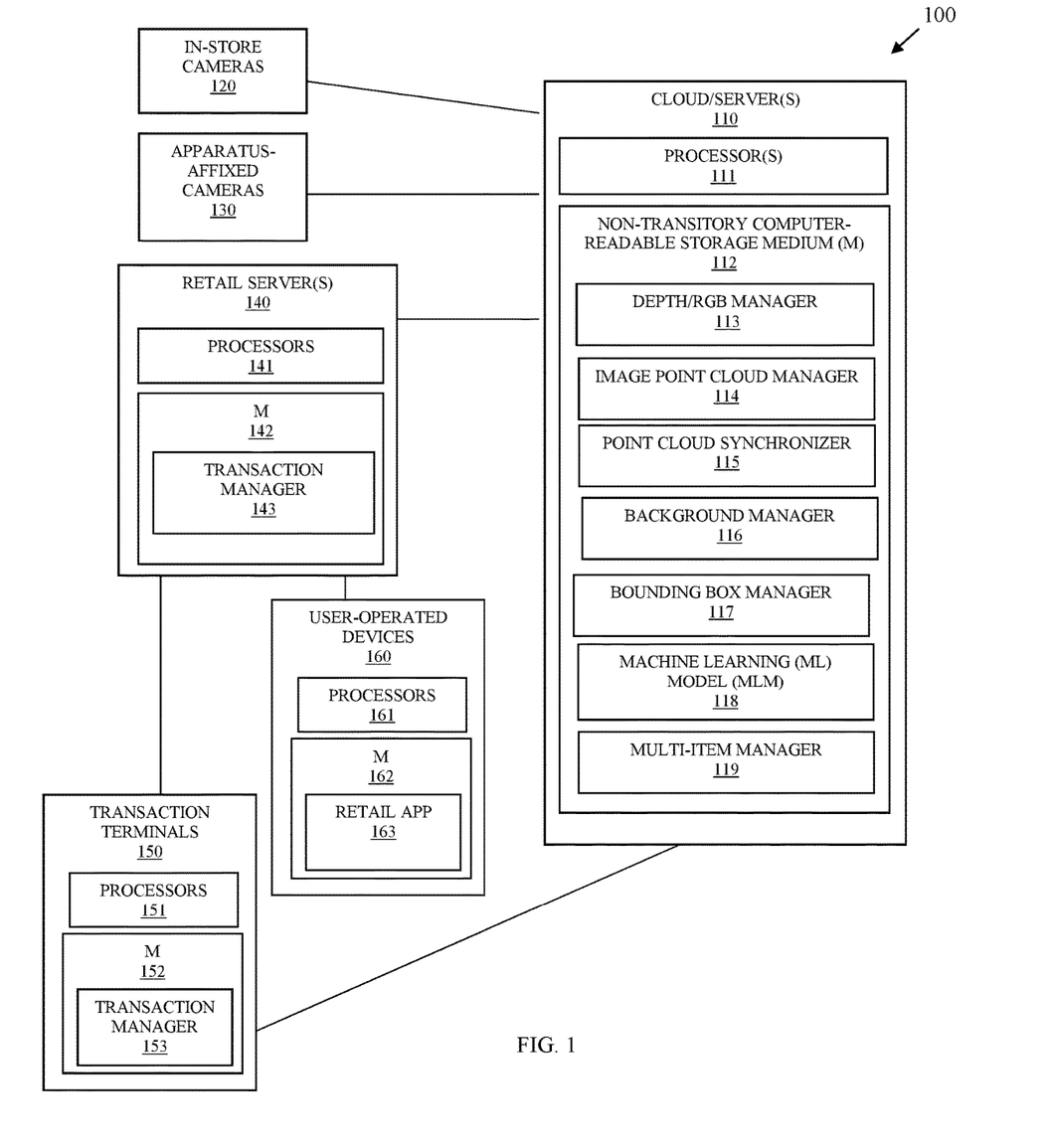
FIG. 1 is a diagram of a system for multi-item product recognition during checkouts, according to an example embodiment.

FIG. 1 is a diagram of a system 100 for multi-item product recognition during checkouts, according to an example embodiment. It is to be noted that the components are shown schematically in greatly simplified form, with only those components relevant to understanding of the embodiments being illustrated.

Furthermore, the various components (that are identified in system/platform 100) are illustrated and the arrangement of the components are presented for purposes of illustration only. It is to be noted that other arrangements with more or less components are possible without departing from the teachings of multi-item product recognition for checkouts, presented herein and below.

As used herein a "scene" refers to a defined area where a set or multi-items of a customer are being monitored through multiple images taken at multiple different angles. The multi-items can be stationary or can be moving with the customer in a basket, a cart, in their hands and arms, or in a bag. The area can be any predefined shape, predefined size, and predefined dimensions.

System 100 illustrates a variety of components that permit multiple images of items (products) captured at different angles by multiple different types of cameras 120 or cameras 130 of a same type within a scene. The items may be placed together in a basket, in a cart, held by a customer, and/or placed on a countertop when the images of the scene are captured and provided to cloud/server 110. Depth information returned by the cameras 120 and/or 130 and Red, Green, Blue (RGB) color data returned by the cameras 120 and/or 130 are used to create point clouds representing the scene as captured by each camera 120 or 130.

The point clouds are then aligned and synchronized to create a single point cloud of the scene, since each separate camera 120 or 130 has a field of view that is pre-mapped to the scene and the lens of each camera 120 or 130 is at a preset angle and distance from the scene. This allows the depth information and RGB data for each item in the scene to be associated with a given location within the scene and the depth information and RGB data for each item integrated together in a single point cloud. Known background pixels associated with the scene are removed so that all that remains in the single point cloud is depth information and RGB data for the items in the scene.

The depth information and RGB data is clustered together based on nearness (closeness/distance between other depth information and RGB data) within the scene. A total number of items in the scene is then counted based on the number of clusters associated with depth information and RGB data. A three-dimensional (3D) bounding box is placed around each individual item (cluster). Each cluster within each 3D bounding box representing a stitched together 3D image of each image in the scene. The pixel data (can be RGB data and/or greyscale depth pixel data in the depth information) associated with each cluster (each unique item within the point cloud) and provided as input to a trained machine-learning model that outputs a confidence level as a percentage that a given item is associated with a specific item code from a product catalogue of a retailer. The location of each of the cluster of points in the point cloud can be obtained and associated with the corresponding 2D RGB image, so that each item can be associated across all the images or camera views. As such, multiple views of a single item are considered when determining the item code for any given cluster within the point cloud.

Essentially, a pipeline of operations are performed on multiple images taken of a scene, the scene comprises multiple items placed within the scene. Accuracy of a total item count for the multiple items and item recognition for each of the multiple items is improved through processing the pipeline of operations.

Various embodiments are now discussed in great detail with reference to FIG. 1.

System 100 comprises a cloud/server 110, in-store cameras 120, apparatus-affixed cameras 130, one or more retail server 140, transaction terminals 150, and user-operated devices 160.

Cloud/Server 110 comprises a processor 111 and a non-transitory computer-readable storage medium 112. Medium 112 comprises executable instructions for a depth/RGB manager 113, an image point cloud manager 114, a point cloud synchronizer 115, a background manager 116, a bounding box manager 117, a machine-learning (ML) model (MLM), 118, and a multi-item management 119. The executable instructions when provided or obtained by the processor 111 from medium 112 cause the processor 111 to perform operations discussed herein with respect to 113-119.

In-store cameras 120 may be stationary cameras placed throughout a store, such as overhead cameras situated overhead of transaction areas of terminals 150 and/or situated along side countertops associated with terminals 150.

Apparatus-affixed cameras 130 may be affixed to the sides of baskets and carts. One camera 130 for a cart or a basket may be placed along a top edge of the cart or basket and pointed down into the basket or cart. Other cameras 130 for the cart or basket may be affixed to 2 or more sides of the cart or basket focused into the cart or basket.

In an embodiment, only apparatus-affixed cameras 130 are used for the embodiments discussed below.

In an embodiment, only in-store cameras 120 are used for the embodiments discussed below.

In an embodiment, a combination of in-store cameras and apparatus-affixed cameras 130 are used for the embodiments discussed below.

In an embodiment, 3 cameras 120 and/or 130 are used for the embodiments discussed below.

In an embodiment, 4 cameras 120 and/or 130 are used for the embodiments discussed below.

In an embodiment, 5 or more cameras 120 and/or 130 are used for the embodiments discussed below.

In an embodiment, one or all of the cameras 120 and/or 130 are depth cameras.

Each retail server 140 comprises at least one processor 141 and a non-transitory computer-readable storage medium 142. Medium 142 comprises executable instructions for a transaction manager 143. The executable instructions when provided or obtained by the processor 141 from medium 142 cause the processor 141 to perform operations discussed herein with respect to 143.

Each transaction terminal 150 comprises at least one processor 151 and a non-transitory computer-readable storage medium 152. Medium 152 comprises executable instructions for a transaction manager 153. The executable instructions when provided or obtained by the processor 151 from medium 152 cause the processor 151 to perform operations discussed herein with respect to 153.

Each user-operated device 160 comprises at least one processor 161 and a non-transitory computer-readable medium 162. Medium 162 comprises executable instructions for a retail application (app) 163. The executable instructions when provided or obtained by the processor 161 from medium 162 cause the processor 161 to perform operations discussed herein with respect to 163.

Multiple items or products are placed in a designated area that cameras 120 and 130 are focused on for capturing a scene of the items from the designated area. The designated area can be stationary (such as a countertop of a transaction area associated with terminals 150 or the designated area can be moving with a customer that has the items placed in a cart (one type of apparatus) or a basket (another type of apparatus) equipped with apparatus-affixed cameras 130.

The images are streamed directly to multi-item manager 119 from the cameras 120 and/or 130 are streamed directly by cameras 120 and/130 into storage of a network-accessible file location that multi-item manager 119 monitors. The images of the scene are provided by multi-item manager 119 to depth/RGB manager 113 which extracts the depth information for each of the items and RGB data for each of the items. The depth information for the scene of items and the RGB data for the scene of items is piped directly into image point cloud manager 114.

Image point cloud manager 114 creates point clouds for each image taken by each camera 120 and/or 130 that comprise each image's extracted depth information and RGB data. The point clouds for the single scene of items is then piped directly into point cloud synchronizer 115.

Point cloud synchronizer 115 uses known information associated with each camera 120 and/or 130 (such as camera angle, camera distance to surfaces of the designated area for the scene, camera quality (density of pixels per inch), etc.) to create a synchronized or mapped single point cloud for the scene that comprises the individual depth information and RGB data for each image patched and assembled into the single point cloud. Synchronizer 115 integrates all depth information and RGB data from the point clouds of all the cameras 120 and 130 into a single patched point cloud. The single point cloud is then piped to background manager 116.

In an embodiment, to link the images of all the cameras 120 and/130 into a single patched point cloud, point cloud synchronizer 115 utilizes a transformational matrix which aligns a given camera's coordinates to real-world coordinates associated with the designated area of the scene.

Background manager 116 is trained on image data captured by each camera 120 and 130 to identify and to remove known background pixels data for known backgrounds of the scene, such as wire or plastic associated with a cart or basket, flooring associated with a floor, countertops associated with surfaces of a countertop known to be in the background, shelves associated with surfaces of shelves known to be in the background, etc. The single point cloud with background pixels removed is then piped to bounding box manager 117.

Bounding box manager 117 performs a clustering algorithm on the remaining depth information and RGB data for the scene in the single point cloud. This associates the component point cloud points that each individual camera 120 and/or 130 was contributing. The bounding box manager 117 creates a bounding box around each cluster, resulting in a single bounding box per item in the scene of the designated area. Each item's 3D bounding box can be used to create 2D bounding boxes in each 2D RGB image where the item is visible.

Multi-item manager 119 counts the number of bounding boxes in the single point cloud. The count is equal to the number of items present in the scene and the RGB data within the corresponding bounding box are fed individually to a trained MLM 118 for item recognition of each item present within the scene.

In an embodiment instead of the RGB data being fed from the single point cloud being fed to the MLM 118. The single point cloud is processed to identify where in the original 2D RGB images each item is located. A 2D bounding boxes for each of the original images is created and each of the images are fed to the MLM 118. Each image patch (identified by the 2D bounding box in the original image) receives its own item code assignment and confidence value back from the MLM 118. The outputs for each patch (potential item code) in each item is considered a "vote". If a given item path in a given one of the images receives a different item code or an overall average confidence is below a threshold value, the corresponding patches associated with that 2D bounding box in the original RGB images is considered inconclusive. When the averaged confidence value from the votes exceed a threshold value, the corresponding item code is assigned for those patches presenting in the original RGB images.

MLM 118 returns a confidence factor for each bounding box that identifies how confident the MLM 118 is in its item prediction. An item prediction is an item code associated with a given item in a catalogue of a retailer associated with server 140. When the confidence factor exceeds a predefined percentage, multi-item manager 119 assigns the corresponding item code to the corresponding bounding box in the single point cloud for the scene.

Multi-item manager 118 uses an Application Programming Interface (API) to provide each item code for each item in the scene to transaction manager 143 and/or transaction manager 153. Transaction managers 143 and/or 153 may use the item codes for a variety of purposes during checkout of a customer, such as to identify the transaction details and request payment from the customer and/or for security to verify item codes entered or scanned match what was provided by multi-item manager 118 for purposes of raise security alerts or audits of the customer transaction.

In cases where the customer is using retail app 163 to self-shop and checkout of a store, retail app interacts with transaction manager 143 and transaction manager 143 records the item codes provided by manager 118, obtains the item pricing and item descriptions, and maintains an option within app 163 that the customer can select to see what is currently in the customer's cart or basket along with an option for the customer to checkout at any time.

In an embodiment, system 100 permits the elimination of item bar code scanning during checkouts at terminals 150 that are POS terminals operated by cashiers, permits elimination of item bar code scanning during self-checkouts at terminals 150 that are SSTs operated by the customers. Additionally, system 100 permits elimination of self-scanning by customers of the item bar codes when customers are using retail app 163; rather the customer simply places desired items for their transaction into their cart or basket and the item codes are automatically resolved by system 100 in the manners discussed above.

In an embodiment, MLM 118 is also trained on depth information for each bounded item along with the RGB data. In this way, MLM 118 can identify items of the same type but of a different size, such as distinguishing between an 8-ounce bottle of Coke® from a 12 or 16-ounce Coke®.

In an embodiment when a given item confidence value returned by MLM 118 for a given item in the scene falls below a predefined threshold, multi-item manager 119 sends a message to transaction manager 143 or transaction manager 153 indicating that one item is unaccounted for and cannot be identified. The item code associated with the lower confidence value may also be supplied in the message as a suggestion to provided to a cashier or the customer on what item was not identified. Transaction manager 143 or 153 may use an alert to have the transaction audited by an attendant, such that the item can be identified and properly recorded. The original images associated with the item as determined by the bounding boxes may also be supplied in the message with a request that the customer identify the item or rearrange the items on the designated area of the scene for system 100 to retry and identify the item in question.

In an embodiment, the designated area of the scene is 12 inches by 16 inches or roughly corresponds to the size of a cart, a food tray, a basket or a countertop at a convenience store.

In an embodiment, instead of using background pixel subtraction, background manager 116 uses an RGB segmentation model that is processed to create "masks" of where the items in the scene are and removes pixels where the items are not.

In an embodiment, the MLM 118 is a deep convolutional neural network (CNN) to label 3D image patches, such that the single point cloud with the clustered bounded box are provided to the MLM 118, the MLM 118 labels each bounding box with an item code and a percentage or confidence value (the highest value determined for the corresponding item code by the MLM 118). In this way, each individual RGB data for each bounding box does not have to be passed individually to the MLM 118.

These embodiments and other embodiments are now discussed with reference to the FIGS. 2-3.

Figure 2:
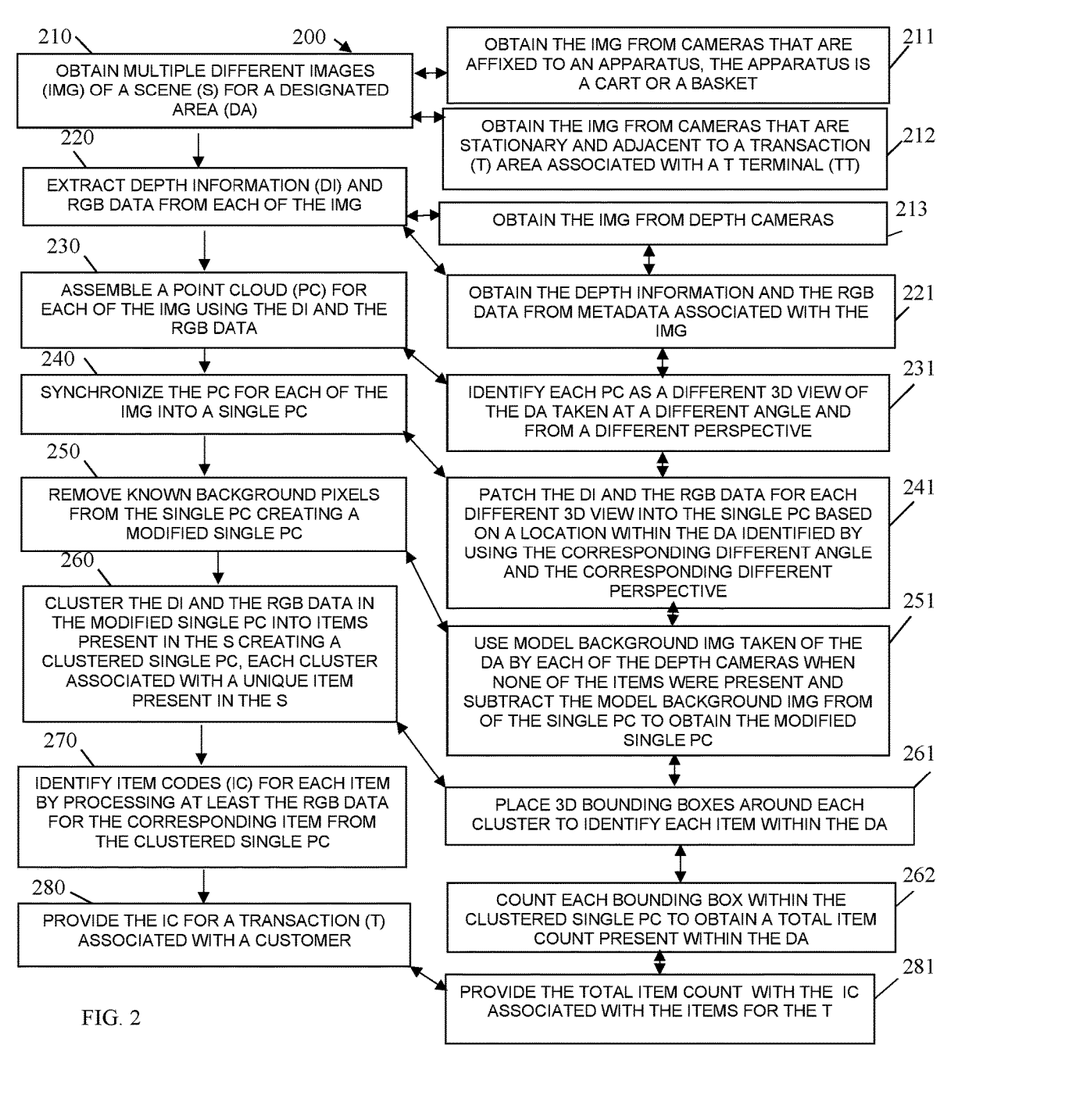
FIG. 2 is a diagram of a method for multi-item product recognition during a checkout, according to an example embodiment.

FIG. 2 is a diagram of a method 200 for multi-item product recognition during a checkout, according to an example embodiment. The software module(s) that implements the method 200 is referred to as a "scene item identifier." The scene item identifier is implemented as executable instructions programmed and residing within memory and/or a non-transitory computer-readable (processor-readable) storage medium and executed by one or more processors of a device. The processor(s) of the device that executes the scene item identifier are specifically configured and programmed to process the scene item identifier. The scene item identifier has access to one or more network connections during its processing. The network connections can be wired, wireless, or a combination of wired and wireless.

In an embodiment, the scene item identifier executes on cloud 110. In an embodiment, the scene item identifier executes on server 110.

In an embodiment, the scene item identifier is all or some combination of 113, 114, 115, 116, 117, 118, and 119.

At 210, the scene item identifier obtains multiple different images of a scene for a designated area.

In an embodiment, at 211, the scene item identifier obtains the images from cameras 130 that are affixed to an apparatus. The apparatus is a cart or a basket.

In an embodiment, at 212, the scene item identifier obtains the images from cameras 120 that are stationary and adjacent to a transaction area associated with a transaction terminal 150.

In an embodiment, at 213, the scene item identifier obtains the images from depth cameras that are affixed to an apparatus 130, adjacent to a transaction area 120, or a combination of affixed to an apparatus 130 and adjacent to a transaction area 120.

At 220, the scene item identifier extracts depth information and RGB data from each of the images.

In an embodiment of 213 and 220, at 221, the scene item identifier obtains the depth information and the RGB data from metadata associated with the images.

At 230, the scene item identifier assembles a point cloud for each image using the depth information and the RGB data.

In an embodiment of 221 and 230, at 231, the scene item identifier identifies each point cloud as a different 3D view of the designated area taken at a different angle and from a different perspective by each of the depth cameras 120 and/or 130.

At 240, the scene item identifier synchronizes the point clouds for each of the images into a single point cloud.

In an embodiment of 231 and 240, at 241, the scene item identifier patches the depth information and the RGB data for each different 3D view into the single point cloud based on a location within the designated area identified by using the corresponding different angle and the corresponding different perspective of the corresponding depth cameras 120 and/or 130.

At 250, the scene item identifier removes known background pixels from the single point cloud creating a modified single point cloud.

In an embodiment of 241 and 250, at 251, the scene item identifier uses model background images taken of the designated area by each of the depth cameras 120 and/or 130 when none of the items were present. The scene item identifier subtracts the background images from the single point cloud to obtain the modified single point cloud.

At 260, the scene item identifier clusters the depth information and the RGB data in the modified single point cloud into items that are present in the scene and creates a clustered single point cloud. Each cluster associated with a unique item present in the scene of the designated area.

In an embodiment of 251 and 260, at 261, the scene item identifier places a 3D bounding box around each cluster to identify each item within the designated area.

In an embodiment of 261 and at 262, the scene item identifier counts each bounding box within the clustered single point cloud to obtain a total item count present within the designated area.

At 270, the scene item identifier identifies the item codes for each item by processing at lest the RGB data for the corresponding item from the clustered single point cloud. This is achieved cloud by using each cluster from the clustered single point cloud and associating image patches from the images and identifying the item codes for each group of associated image patches from at least the RGB data when corresponding ones of the images had portions of a given item visible. Stated another way, the clustered single point cloud includes RGB data for each item clustered together and patched together to create a multi view of the given item, all the image patches for one cluster in the single point cloud represents all the available RGB data for a given item, this RGB data is used to create 2D bounding boxes around the original taken images and each image is fed to a trained MLM 118, which then labels each bounding box with a potential item code and a confidence value. A voting approach or average confidence value approach is used to determine whether to use the potential item code or whether to not use the potential item code.

At 280, the scene item identifier provides the item codes for a transaction associated with a customer.

In an embodiment of 262 and 280, at 281, the scene item identifier provides the total item count with the item codes associated with the items for the transaction.

Figure 3:
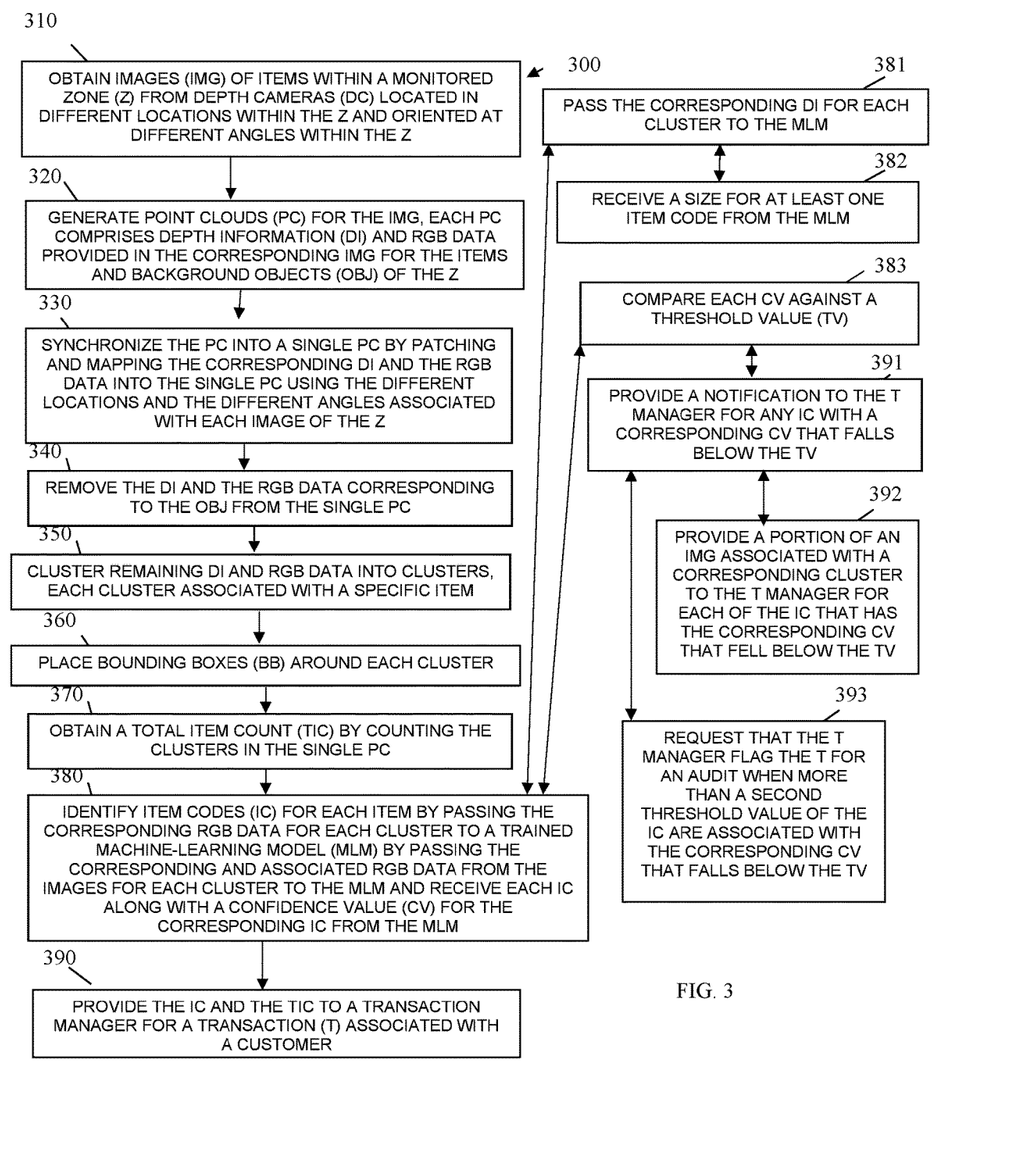
FIG. 3 is a diagram of another method for multi-item product recognition during a checkout, according to an example embodiment.

FIG. 3 is a diagram of another method 300 for multi-item product recognition during a checkout, according to an example embodiment. The software module(s) that implements the method 200 is referred to as a "multiple item recognizer." The multiple item recognizer is implemented as executable instructions programmed and residing within memory and/or a non-transitory computer-readable (processor-readable) storage medium and executed by one or more processors of a device. The processor(s) of the device that executes the multiple item recognizer are specifically configured and programmed to process the multiple item recognizer. The multiple item recognizer has access to one or more network connections during its processing. The network connections can be wired, wireless, or a combination of wired and wireless.

In an embodiment, the device that executes the multiple item recognizer is cloud 110. In an embodiment, the device that executes the multiple item recognizer is server 110.

In an embodiment, the multiple item recognizer is all or some combination of 113, 114, 115, 116, 117, 118, 119, and/or method 200.

At 310, the multiple item recognizer obtains images of items within a monitored zone from depth cameras 120 and/or 130 located in different locations within the monitored zone and oriented at different angles within the monitored zone.

At 320, the multiple item recognizer generates point clouds for the images, each point cloud comprises depth information and RGB data provided in the corresponding images for the items and background objects of the monitored zone.

At 330, the multiple item recognizer synchronizes the point clouds into a single point cloud by patching and mapping the corresponding depth information and the RGB data into the single point cloud using the different locations and the different angles associated with each image of the monitored zone.

At 340, the removes the depth information and the RGB data that corresponds to the background objects from the single point cloud.

At 350, the multiple item recognizer clusters remaining depth information and RGB data into clusters, each cluster associated with a specific item.

At 360, the multiple item recognizer places bounding boxes around each cluster.

At 370, the multiple item recognizer obtains a total item count by counting the clusters in the single point cloud.

At 380, the multiple item recognizer identifies item codes for each item by passing the corresponding RGB data for each cluster to a trained MLM 118 and receiving each item code along with a confidence value for the corresponding item code back from the trained MLM 118.

In an embodiment, at 381, the multiple item recognizer passes the corresponding depth information for each cluster to the trained MLM 118.

In an embodiment of 381 and at 382, the multiple item recognizer receives a size for at least one item code back from the trained MLM 118 responsive to the corresponding depth information.

In an embodiment, at 383, the multiple item recognizer compares each confidence value against a threshold value.

At 390, the multiple item recognizer provides the item codes and the total item count to a transaction manager 143 or 153 for a transaction associated with a customer.

In an embodiment of 383 and 390, at 391, the multiple item recognizer provides a notification to the transaction manager 143/153 for any item code with a corresponding confidence value that falls below the threshold value.

In an embodiment of 391 and at 392, the multiple item recognizer provides a portion of an image associated with the corresponding cluster to the transaction manager 143/153 for each of the item codes that has the corresponding confidence value that fell below the threshold value.

In an embodiment of 391 and at 392, the multiple item recognizer request that the transaction manager 143/153 flag the transaction for an audit when more than a second threshold value of the item codes are associated with the corresponding confidence value that falls below the threshold value.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
obtaining multiple different images of a scene for a designated area;
extracting depth information and red, green, blue (RGB) data from each of the multiple different images;
assembling a point cloud for each of the multiple different images using the depth information and the RGB data;
synchronizing the point cloud for each of the multiple different images into a single point cloud;
removing known background pixels from the single point cloud creating a modified single point cloud;
clustering the depth information and the RGB data in the modified single point cloud into items present in the scene creating a clustered single point cloud, each cluster associated with a unique item present in the scene;
identifying item codes for each item by processing at least the RGB data for a corresponding item from the clustered single point cloud by using each cluster from the clustered single point cloud and associating image patches from the multiple different images and identifying the item codes for each group of associated image patches from at least the RGB data when corresponding ones of the multiple different images had portions of a given item visible;
wherein identifying further includes receiving a confidence value for each item code and requesting that a transaction manager flag a transaction for an audit when more than a predefined number of the item codes are associated with corresponding confidence values that fall below a threshold value; and
providing the item codes for the transaction associated with a customer.

2. The method of claim 1, wherein obtaining further includes obtaining the multiple different images from cameras that are affixed to an apparatus, wherein the apparatus is a cart or a basket.

3. The method of claim 1, wherein obtaining further includes obtaining the multiple different images from cameras that are stationary and adjacent to a transaction area associated with a transaction terminal.

4. The method of claim 1, wherein obtaining further includes obtaining the multiple different images from depth cameras that are stationary, affixed to an apparatus, or a combination of stationary and affixed to the apparatus.

5. The method of claim 4, wherein extracting further includes obtaining the depth information and the RGB data from metadata associated with the multiple different images.

6. The method of claim 5, wherein assembling further includes identifying each point cloud as a different three-dimensional view of the designated area taken at a different angle and from a different perspective.

7. The method of claim 6, wherein synchronizing further includes patching the depth information and the RGB data for each different three-dimensional view into the single point cloud based on a location within the designated area identified by using a corresponding different angle and a corresponding different perspective.

8. The method of claim 7, wherein removing further includes using model background images taken of the designated area by each of the depth cameras when none of the items were present and subtracting out the model background images from the single point cloud to obtain the modified single point cloud.

9. The method of claim 8, wherein clustering further includes placing three-dimensional bounding boxes around each cluster to identify each item within the designated area.

10. The method of claim 9, wherein clustering further includes counting each bounding box within the modified single point cloud to obtain a total item count present within the designated area.

11. The method of claim 10, wherein providing further includes providing the total item count with the item codes associated with the items for the transaction.

12. A method, comprising:
obtaining images of items within a monitored zone from depth cameras located in different locations within the monitored zone and oriented at different angles within the monitored zone;
generating point clouds for the images, each point cloud comprises depth information and red, green, blue (RGB) data provided in a corresponding image for the items and for background objects of the monitored zone;
synchronizing the point clouds into a single point cloud by patching and mapping corresponding depth information and the RGB data into the single point cloud using the different locations and the different angles associated with each image of the monitored zone;
removing the depth information and the RGB data corresponding to the background objects from the single point cloud;
clustering remaining depth information and RGB data into clusters, each cluster associated with a specific item;
placing bounding boxes around each cluster;
obtaining a total item count by counting the clusters in the single point cloud;
identifying item codes for each item by passing corresponding RGB data for each cluster to a trained Machine-Learning Module (MLM) by passing the corresponding RGB data and associated RGB data from the images for each cluster to the trained MLM and receiving each item code along with a confidence value for a corresponding item code from the trained MLM; and
providing the item codes and the total item count to a transaction manager for a transaction associated with a customer;
wherein the transaction manager uses the item codes to identify transaction details and request payment from the customer and for security to verify item codes entered or scanned match what was provided for purposes of raising security alerts or audits associated with the transaction.

13. The method of claim 12, wherein identifying further includes passing the corresponding depth information for each cluster to the trained MLM.

14. The method of claim 13, wherein passing the corresponding depth information further includes receiving a size for at least one item code from the trained MLM.

15. The method of claim 12, wherein identifying further includes comparing each confidence value against a threshold value.

16. The method of claim 15, wherein providing further includes providing a notification to the transaction manager for any item code with a corresponding confidence value that falls below the threshold value.

17. The method of claim 16, wherein providing further includes providing a portion of an image associated with a corresponding cluster to the transaction manager for each of the item codes that has the corresponding confidence value that fell below the threshold value.

18. The method of claim 16, wherein providing further includes requesting that the transaction manager flag the transaction for an audit when more than a second threshold value of the item codes are associated with the corresponding confidence value that falls below the threshold value.

19. A system, comprising:
depth cameras;
a server comprising at least one processor and a non-transitory computer-readable storage medium;
the non-transitory computer-readable storage medium comprises executable instructions; and
the executable instructions when executed by the at least one processor from the non-transitory computer-readable storage medium cause the at least one processor to perform operations comprising:
obtaining images captured by the depth cameras of a designated area, wherein the designated area comprises items in a transaction of a customer;
mapping depth information and red, green, blue (RGB) data for each image into a point cloud;
patching each point cloud into a single point cloud representing a single three-dimensional image from the images of the designated area;
removing background pixel data associated with the single three-dimensional image;
clustering the depth information and the RGB data corresponding to the single three-dimensional image with the background pixel data removed into clusters, each cluster representing a single one of the items;
obtaining a total count of items by counting the clusters in the single three-dimensional image;
placing three-dimensional (3D) bounding boxes around each cluster;
passing the single three-dimensional (3D) image with the three-dimensional bounding boxes identified to a trained machine-learning model (MLM);
receiving an item code for each of the 3D bounding boxes along with a confidence value back from the trained MLM as output;
providing item codes associated with corresponding confidence values that meet or exceed a threshold value to a transaction manager that is processing the transaction for the customer; and
cropping at least one image from the images associated with at least one item code having a corresponding confidence value that falls below the threshold value and sending an alert to the transaction manager indicating that the customer should identify a corresponding item code by scanning or by rearranging the items in the designated area and when the items are rearranged in the designated area iterating back to the obtaining of the images for the depth cameras to take new images of the designated area;
wherein the designated area is twelve inches by sixteen inches or roughly corresponds to a size of a cart, a food tray, a basket or a countertop at a convenience store.

20. The system of claim 19, wherein the depth cameras are affixed to a basket, or a cart carried by the customer or wherein the depth cameras are affixed to or surround a transaction area associated with a transaction terminal where the customer is performing the transaction, wherein a portion of the transaction area comprises the designated area.

* * * * *